US010011007B2

(12) United States Patent
Velez

(10) Patent No.: US 10,011,007 B2
(45) Date of Patent: Jul. 3, 2018

(54) UNIVERSAL CENTER PUNCH

(71) Applicant: Sumner Manufacturing Co., Inc., Houston, TX (US)

(72) Inventor: Lawrence Velez, Houston, TX (US)

(73) Assignee: SUMNER MANUFACTURING COMPANY, LLC, Houston, TX (US)

( * ) Notice: Subject to any disclaimer, the term of this patent is extended or adjusted under 35 U.S.C. 154(b) by 166 days.

(21) Appl. No.: 15/289,479

(22) Filed: Oct. 10, 2016

(65) Prior Publication Data
US 2018/0099390 A1 Apr. 12, 2018

(51) Int. Cl.
*B25D 5/00* (2006.01)
*B25D 5/02* (2006.01)
*G01C 9/00* (2006.01)

(52) U.S. Cl.
CPC ................ *B25D 5/02* (2013.01); *G01C 9/00* (2013.01)

(58) Field of Classification Search
CPC .................................. B25D 5/02; B25D 25/00
USPC ..................................... 33/671–675
See application file for complete search history.

(56) References Cited

U.S. PATENT DOCUMENTS

| 948,523 A | | 2/1910 | Perkins | |
|---|---|---|---|---|
| 1,630,505 A | * | 5/1927 | Walther | B25D 5/02 33/674 |
| 2,482,360 A | | 9/1949 | Moore | |
| 2,526,528 A | | 10/1950 | Zickler et al. | |
| 2,565,262 A | * | 8/1951 | Parks | B25D 5/02 269/19 |
| 2,659,975 A | | 11/1953 | Van Gundy | |
| 2,719,364 A | | 10/1955 | Johnson | |
| 2,735,190 A | | 2/1956 | Jordan et al. | |
| 2,782,519 A | * | 2/1957 | Gill | B25D 5/02 33/642 |
| 2,833,052 A | * | 5/1958 | Foster | B25D 5/00 33/671 |
| 2,834,116 A | | 5/1958 | Hambrick | |
| 3,011,258 A | | 12/1961 | Kotchan | |
| 3,075,294 A | * | 1/1963 | Strecker | B23Q 17/2275 33/644 |
| 3,230,631 A | | 1/1966 | Skidmore | |
| 3,482,324 A | * | 12/1969 | Samhat | B25D 5/00 30/368 |
| 3,601,897 A | * | 8/1971 | Muller | B23Q 17/225 33/555.1 |
| 3,661,469 A | * | 5/1972 | Leff | B23B 47/281 33/672 |
| 4,447,956 A | * | 5/1984 | Chung | B25D 5/02 33/520 |
| 5,398,577 A | * | 3/1995 | Pierce | A01G 23/099 144/335 |

(Continued)

*Primary Examiner* — G. Bradley Bennett
(74) *Attorney, Agent, or Firm* — Egbert Law Offices, PLLC

(57) ABSTRACT

A universal center punch has a body with a passage therein, a punch rod extending along the passage, a first leg pivotally mounted adjacent one side of the body so as to extend outwardly of the body, and a second leg pivotally mounted adjacent an opposite side of the body so as to extend outwardly of the body. The first and second legs are linked together so such that a movement of one of the legs causes a corresponding movement of the other leg. Each of the legs has a magnet thereon. An inclinometer can be removably affixed to the body so as to measure an inclination of the punch rod.

20 Claims, 5 Drawing Sheets

(56) References Cited

U.S. PATENT DOCUMENTS

| | | | |
|---|---|---|---|
| 6,581,294 B2 | 6/2003 | Svaldi | |
| 2006/0130348 A1* | 6/2006 | Lyman, Jr. | B23Q 9/0042 |
| | | | 33/520 |
| 2010/0170100 A1* | 7/2010 | Weigel | B25D 5/00 |
| | | | 33/520 |
| 2013/0113150 A1* | 5/2013 | Velez | B25B 5/147 |
| | | | 269/156 |
| 2018/0056494 A1* | 3/2018 | Echasserieau | B25D 5/02 |

* cited by examiner

UNIVERSAL CENTER PUNCH

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT 29

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to center punches. More particularly, the present invention relates to center punches that are adapted to mark a surface of a pipe. More particularly, the present invention relates to center punches that are adaptable to various diameters of pipe. Furthermore, the present invention relates to center punches in which the punch tool travels generally the same distance regardless of the diameter of the pipe.

2. Description of Related Art Including Information Disclosed Under 37 CFR 1.97 and 37 CFR 1.98

An automatic center punch is a hand tool used to produce a dimple in a workpiece (for example, a piece of metal). It performs the same function as an ordinary center punch the without the need for a hammer. When pressed against the workpiece, it stores energy in a spring, eventually releasing it as an impulse that drives the punch so as to produce the dimple.

The automatic center punch mechanism has been used in the past for a wide variety of applications. These includes the marking and starting of a hole for drilling without the bit "walking" out of alignment, for letter stamp sets, for glass-breaking tools used in rescue work, for impact tools for hardness testing, and for pin presses for electronic assemblies. Each automatic center punch includes a spring which serves to store energy, a master provides the impulse, a release mechanism that releases the stored energy at a consistent point in the travel of the body, and a provision to reset the device after actuation.

Center punches have also commonly been used for the marking of pipe. It is known that pipes have a wide variety of diameters. In prior art center punches, such as those manufactured by the current applicant, there are a pair of wings that fixedly extend at an angle outwardly of the punch body. These wings are intended to reside on the outer diameter of the pipe so that the punch tool can be located in a desired position. These wings are fixed. As such, for large diameter pipe, the distance that the punch tool must travel will be greater than the distance the punch tool travels on smaller diameter pipes. As a result, an inconsistent marking of the pipe can occur. The marking may be much lighter on a large diameter pipes because of a loss of kinetic energy in the punch tool during the longer distance of travel. As such, a need has developed so as to provide a punch tool that can adapt to the various diameters of pipe and also provide a consistent punch regardless of the diameter of the pipe. In other words, it is important to assure that the punch tool travels the same distance regardless of the diameter of the pipe.

Additionally, center punches have been developed for use on pipes which are intended to be positioned at the top dead center of the pipe. As such, it was necessary to rotate the pipe so that the punch tool was at the desired location. If the punch tool were not at the dead center position, then there was the possibility that the punch tool could slip off of the pipe or move because of the effect of gravity on the punch tool. As such, a need has developed so as to assure that the punch tool can be placed at any desired location around the diameter of the pipe.

In the past, center punches have generally been located by visual methods. The worker would position the center punch at the location that the worker felt was the top dead center of the pipe. In other circumstances, tools were used so as to measure the diameter of the pipe into properly locate the center punch at the proper location on the pipe. Often, these measurements were not completely accurate. As such, the location of the dimple produced by the center punch could be slightly away from the desired position. Recently, digital inclinometers have been developed so as to substitute for conventional bubble levels. As such, an inclinometer could be used with a center punch so as to provide the user with a proper numerical indication of the top dead center position or the desired angle. These inclinometers are relatively expensive. As such, the digital inclinometers have not been commonly used with center punches in the past. It would be desirable if the inclinometer could be separated from the center punch and used in other applications.

In the past, various patents have issued with respect to center punches. For example, an early patent is that of U.S. Pat. No. 948,523, issued on Feb. 8, 1910 to W. E. Perkins. This patent describes a marking gauge having a graduate dial with an offset in the back thereof and a pair of divergent legs projecting from the dial. A center punch is mounted in the offset and passes between the legs. An indicator is pivotally mounted in the front of the dial.

U.S. Pat. No. 2,482,360, issued on Sep. 20, 1949 to W. K. Moore, describes an angle binder for cylinders for use in association with center punches. This angle binder has a pair of elongated complementary work-contacting adapters in a substantially V-shape and hingedly connected to one another at their inner ends. The adapters are provided at the inner ends with coacting measuring and indicating elements.

U.S. Pat. No. 2,526,528, issued Oct. 17, 1950 to C. R. Zickler et al., provides a magnetic layout punch. This magnetic layout punch has an outer magnetic casing with a bottom foot portion thereon and a permanent inner magnet of a hollow cylindrical shape tightly fitted within a non-magnetic blushing and the outer casing. An inner bushing has a radially extended bottom flange engaging with the bottom end of the inner magnet. The outer casing has a radially inwardly extending flange on its upper end to provide a top face. The inner bushing has a radially outwardly extending flange on its upper end which extends outwardly over the top face of the inwardly extending flange of the outer casing so as to retain the inner magnet against outward and downward movements. A punch element is adjustably mounted through the inner bushing and is extendable through the lower end of the bushing.

U.S. Pat. No. 2,659,975, issued on Nov. 24, 1953 to J. F. Van Gundy, discloses a pipe tool that has a pair of angularly inclined plates whereby the plates are pivoted in relation to each other. A gauging device is attached between the plates and includes an indicator member. The indicator member is a bubble level. Indicating means is marked on the extending portions for indicating the topmost longitudinal centerline along the pipe incidental upon registration of all of the indicating marks and the level indicated from the bubble level.

U.S. Pat. No. 2,719,364, issued on Oct. 4, 1955 to A. Johnson, shows a center punch with a barrel having a pair of diverging supporting legs on one end thereof. The barrel is adapted to contain a punch and to support a pair of longitudinally extending spirit level tubes spaced from the end of the barrel. A rectangular support is adjacent to the end of the barrel and has a concave side fitting against the barrel.

U.S. Pat. No. 2,735,190, issued on Feb. 21, 1956 to Jordan et al., provides a pipe marking device. This pipe marking device has a body having a pair of legs projecting radially from the periphery of an annulus of the body and having converging pipe-engaging surfaces meeting in an intersection at the periphery of the annulus. The radially inward surface of the annulus at the backside of the annulus is provided with an annular groove. A protractor disc has a peripheral edge rotatably seated in the grooves. A punch shaft is slidably engaged through the brackets. The punch shaft has a striking head on the upper end of the shaft and a marking point at the lower end of the shaft and positioned between the legs.

U.S. Pat. No. 2,834,116, issued on May 13, 1958 to W. P. Hambrick, teaches a centering and marking tool for pipes. This tool includes an elongated channel member having a pair of spaced flat parallel front and rear flanges and adapted to receive a carpenter's square and be slidably adjustable along the square. A spring-retracted punch is slidably fitted in the sleeve and has a punch end. A transverse end in the punch has one end that engages the sleeve so as to limit the traction of the punch.

U.S. Pat. No. 3,011,258, issued on Dec. 5, 1961 to C. J. Kotchan, provides a center punch with a hammer and a magnifier. This device has a shank of a non-magnetic material having an axial hole at one end thereof. A hammer is slidably mounted on the shank. The hammer has a head portion and a magnet affixed thereto. The hammer also has an inwardly tapered lower portion extending toward the end of the shank. This inwardly tapered lower portion includes a striking portion. A pointed tool has a boss removably positioned in the axial hole of the shank. A cap of magnetic material is positioned at the other of the end of this shank such that the magnetic attraction between the magnet and the cap holds the hammer in an elevated position until finger pressure overcomes the magnetic attraction so as to cause the weight of the hammer to fall and strike the anvil.

U.S. Pat. No. 3,230,631, issued on Jan. 25, 1966 to R. H. Skidmore, provides an instrument for marking a point on the surface of a workpiece. This instrument includes a unitary support having a face adapted to lie upon the workpiece, a longitudinal bore extending through the support perpendicular to the face, an optical member adapted to be removably received in the support and rotatable on the axis of the bore and a reticle carried by a member proximate to the work surface. A light serves to illuminate the reticle to enable the operator to sight simultaneously on the reticle and on the surface of the workpiece in order to align the reticle and support with a predetermined locus point on the work surface. A marking punch is slidably fitted on the support bore when the optical unit is removed and has a marking point of the lower end of the same in spaced relation with respect to the support bore. The punch has a striking porch than which, when struck, will cause the marking point to be driven into the surface of the workpiece.

U.S. Pat. No. 6,581,294, issued on Jun. 24, 2003 to L. Svaldi, teaches an angle finder for large diameter ducts and piping. This angle finder includes a pair of legs having front and back sides and top and bottom ends. The top ends are pivotally connected so as to bend to form an invertible adjustable V-shaped configuration. A movable center pointer has a top and a bottom mounted at the top end of the leg so as to bisect the "V" by the legs. An angle finder is used in combination with a laser mounted near the bottom of the movable center point.

It is an object of the present invention to provide a center punch that is adaptable so as to be used with various diameters of pipe.

It is another object of the present invention to provide a center punch in which the punch tool travels at a generally equal distance regardless of the diameter of the pipe.

It is another object of the present invention to provide a center punch which assures a consistent marking on the surface of the pipe, regardless of the diameter of the pipe.

It is another object the present invention to provide a center punch that can be removably secured along any surface of the pipe.

It is still another object of the present invention to provide a punch tool which can be removably magnetically secured to the pipe.

It is another object of the present invention to provide a center punch that includes a digital inclinometer for accurately determining the orientation of the punch tool.

It is still another object of the present invention to provide a center punch which resists deflections and movements once installed on a surface of a pipe.

It is still another object of the present invention to provide a center punch which releases the force of the punch tool through the depressing of a simple pushbutton.

It is still another object the present invention provide a center punch in which the punch tool can be easily charged by the operator.

It is still another object of the present invention to provide a punch tool which is easy to use, easy to manufacture, and relatively inexpensive.

These and other objects and advantages of the present invention will become apparent from a reading of the attached specification and appended claims.

BRIEF SUMMARY OF THE INVENTION

The present invention is a universal center punch that comprises a body having a passage extending therein, a punch rod extending along the passage of the body, a first leg pivotally mounted adjacent one side of the body so as to extend outwardly of the body, and a second leg pivotally mounted adjacent an opposite side of the body so as to extend outwardly of the body. The first and second legs are linked together such that a movement of one leg causes a corresponding movement of the other leg.

In particular, the link between the legs can be carried out, in one embodiment, by the first leg having at least one tooth thereon and the second leg having at least one tooth thereon that meshes with the tooth of the first leg. The body has a channel formed at an end thereof. The first and second legs have a portion positioned in the channel. The teeth of the first and second legs mesh within this channel.

The first leg has a first magnet thereon and the second leg has a second magnet thereon. In particular, the first leg has an orifice formed thereon in which the first magnet is received. The second leg has another orifice formed thereon in which the second magnet is received. The first and second legs have coverings thereon which are located over the magnet.

Each of the first and second legs has a generally planar bottom surface. Each of the first and second legs has a wedge-shape with a first end that has a thickness less than a thickness of the second end. The second end is pivotally mounted to the body while the first end extends outwardly of the body.

In the present invention, an inclinometer is affixed to the body. This inclinometer is adapted to measure an inclination of the punch rod. The inclinometer is removably affixed to the body. The body has an outwardly extending surface upon which the inclinometer is positioned. This outwardly extending surface is in a plane transverse to a longitudinal axis of the punch rod. The inclinometer is, preferably, magnetically connected to this outwardly extending surface.

A spring is received in the passage of the body. The spring bears against a surface of the punch rod. The punch rod has a portion extending outwardly of the body at an upper end thereof. This portion of the punch rod is movable upwardly so as to compress the spring and the charge the punch rod. A pushbutton is resiliently mounted to the body and has a surface extending outwardly of the body. This pushbutton causes the charged punch rod to be released. A ball is positioned in the interior of the body and is cooperative with the punch rod and the pushbutton. The ball is movable to a first position so as to lock the punch rod in the charged position. The ball is movable to a second position so as to release the punch rod from the charged position. The pushbutton has a recess formed thereon. The ball is received in the recess when in the second position. The punch rod also has a recess formed thereon. The ball is received in the recess of the punch rod when in the first position.

This foregoing Section is intended to describe, in particularity, the preferred embodiment of the present invention. It is understood that modifications to these preferred embodiments can be made within the scope of the present invention. As such, this Section should not be construed, in any way, as limiting of the broad scope of the present invention. The present invention should only be limited by the following claims and their legal equivalents.

DETAILED DESCRIPTION OF THE INVENTION

Figure 1:
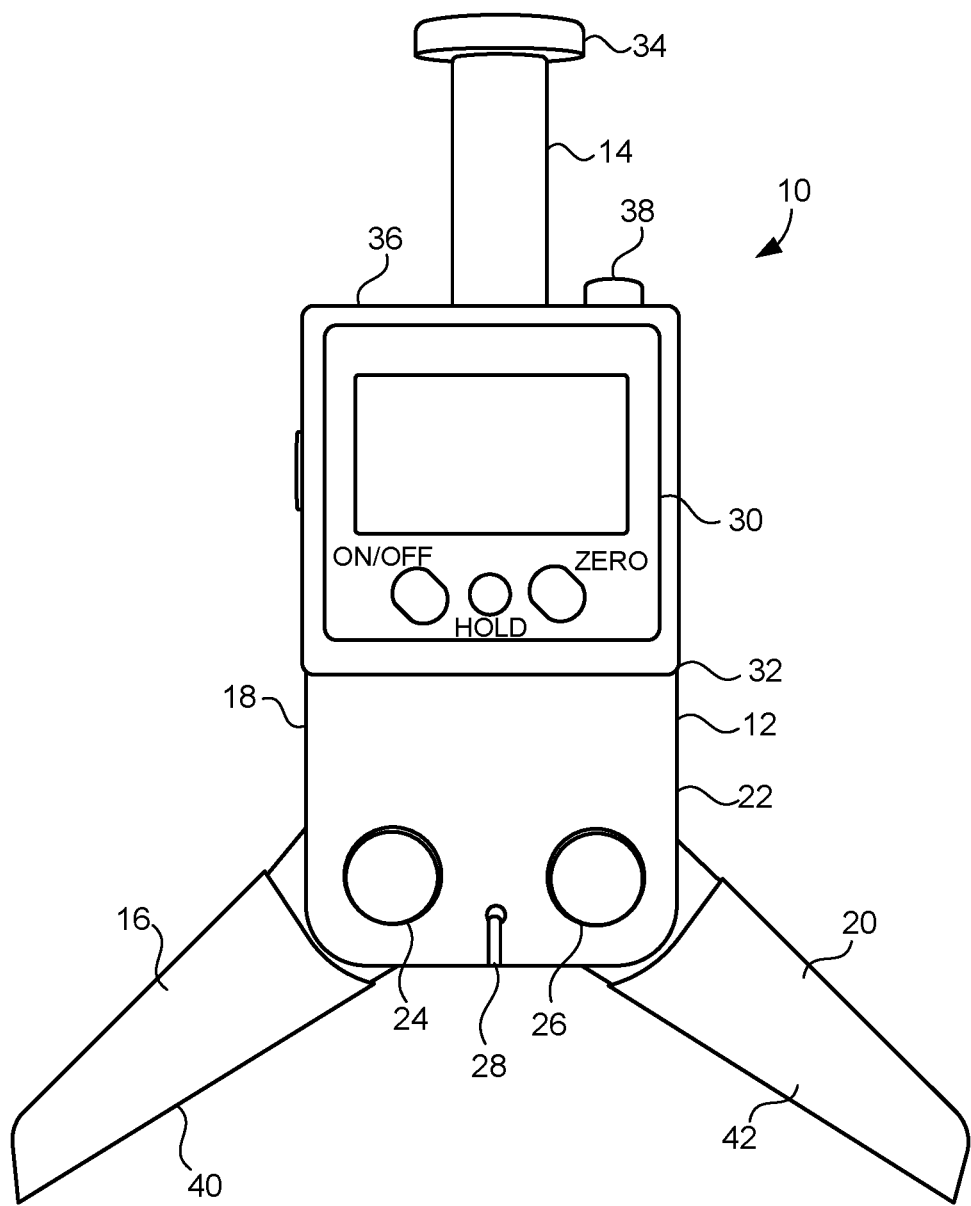
FIG. 1 is a frontal view of the universal center punch of the present invention.

FIG. 1 shows the universal center punch 10 in accordance with teachings of the preferred embodiment of the present invention. The universal center punch 10 includes a body 12, a punch rod 14 extending along a passage within the body 12, a first leg 16 pivotally mounted adjacent one side 18 of the body 12 and extending outwardly of the body 12, and a second leg 20 extending outwardly of an opposite side 22 of the body 12. Each of the legs 16 and 20 are pivotally mounted at pivot points 24 and 26 to the body 12. An alignment mark 28 is provided on the surface of the body 12 in an area in the direct alignment with the pointed end of the punch rod 14. The indicator mark 28 will be indicative of the punch location.

In FIG. 1, it can be seen that an inclinometer 30 is mounted onto an outwardly extending surface 32 of the body 12. The inclinometer 30 is a digital device which measures inclination. In particular, the inclination measured by the inclinometer 30 will be indicative of the orientation of the punch rod 14 and ultimately the location orientation of the indicator mark 28 and the ultimate dimple in the workpiece created by the punch rod 14. The inclinometer 30 is, in the preferred embodiment, magnetically affixed to the outwardly extending surface 32. As such, when the universal center punch 10 is not being used, the inclinometer 30 can simply be removed from the outwardly extending surface 32 and used for various other purposes.

For the operation of the punch rod 14 in the universal center punch 10, there is provided a portion 34 which extends outwardly of the upper end 36 of the body 12. The portion 34 is a knob which has a diameter greater than the diameter of the punch rod 14. In order to charge the punch rod 14, the knob 36 can be moved to an uppermost position. The punch rod would then be locked in place. The charging of the punch rod can be carried out with a relatively simple upward movement of the portion 34. A pushbutton 38 has a surface that extends outwardly of the upper end 36 of the body 12. In order to release the charged punch rod 14, the pushbutton 38 is depressed. This will cause mechanisms within the interior of the body 12 to cooperate so as to remove the lock from the punch rod 14 and cause the spring within the interior of the body 12 to apply a force to the punch rod so that the pointed end of the punch rod 14 travels downwardly so as to form a dimple in a working surface.

In FIG. 1, it can be seen that each of the legs 16 and 20 has a generally wedge-shaped configuration. The bottom surface 40 and the bottom surface 42 of respective legs 16 and 20 are generally planar. As such, there will be a point of contact between the bottom surfaces 40 and 42 and the workpiece. The bottom surfaces 40 and 42, in cooperation with the pivotal connection between the legs 16 and 20 in the body 12, will cause the legs 16 and 20 to automatically adapt to pipes, regardless of the diameter of the pipe. If a wide diameter pipe is used, then the legs 16 and 20 will extend outwardly at a greater angle. If the diameter of the pipe is relatively small, then the legs 16 and 20 will be angularly closer together. This configuration assures that the bottom surface of the body 12 is generally the same distance from the outer surface of the pipe regardless of the diameter of the pipe. As a result, a very uniform punch can be applied to the outer surface of the pipe, regardless of the diameter of the pipe. Each of the legs 16 and 20 has a generally wedge-shape configuration in which the outer end has a thickness that is less than a thickness of the inner end. This wedge-shaped configuration provides the user with a better visual imaging of the orientation of the universal center punch 10 with respect to the underlying pipe.

Figure 2:
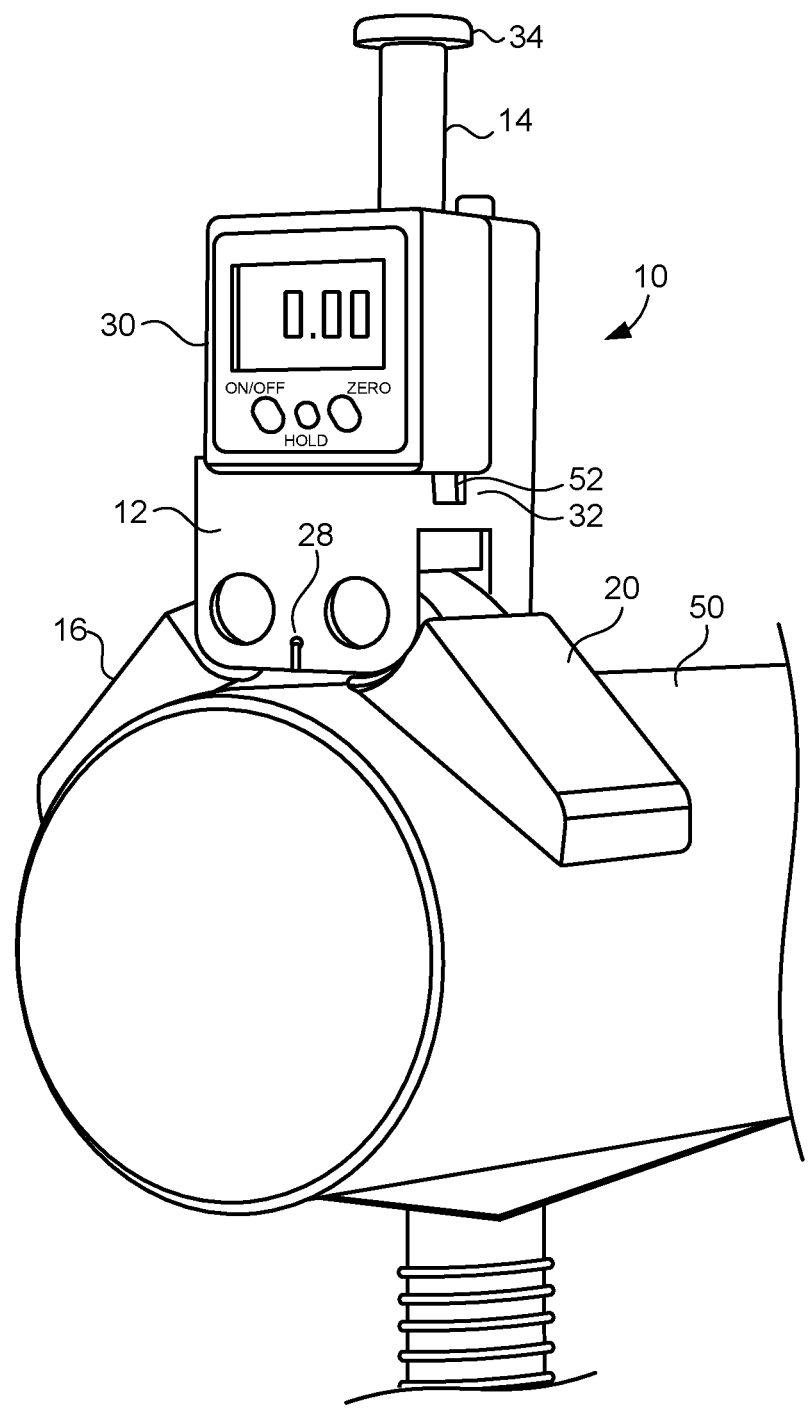
FIG. 2 is a perspective view showing the placement of the universal center punch of the present invention upon a pipe.

FIG. 2 shows the universal center punch 10 of the present invention as applied to a pipe 50. It can be seen that legs 16 and 20 straddle the outer surface of the pipe 50. The indicator mark 28 is placed in the desired position with respect to the surface of the pipe 50. As such, there is a space between the bottom of the body 12 and the outer surface of the pipe 50. This space will allow the punch tool to travel in order to establish a marking on the surface of the pipe 50. The inclinometer 30 is provided in a convenient location for viewing during the operation of the universal center punch 10. In particular, as can be seen in FIG. 2, the inclinometer shows a "0" reading. This means that the bottom surface of the body 12 is level. This will also be indicative of the fact that the punch rod 14 extends directly transverse to the bottom surface of the body 12.

FIG. 2 shows that the body 12 has the outwardly extending portion 32 upon which the bottom of the inclinometer 30 rests. Either the inclinometer 30 can have a magnet on the bottom surface thereof or a magnet 52 can be placed within a slot formed on the outwardly extending surface 32 so as to allow the inclinometer 30 to be easily affixed in a secure position onto the body 12 or to be easily removed for use elsewhere.

Figure 3:
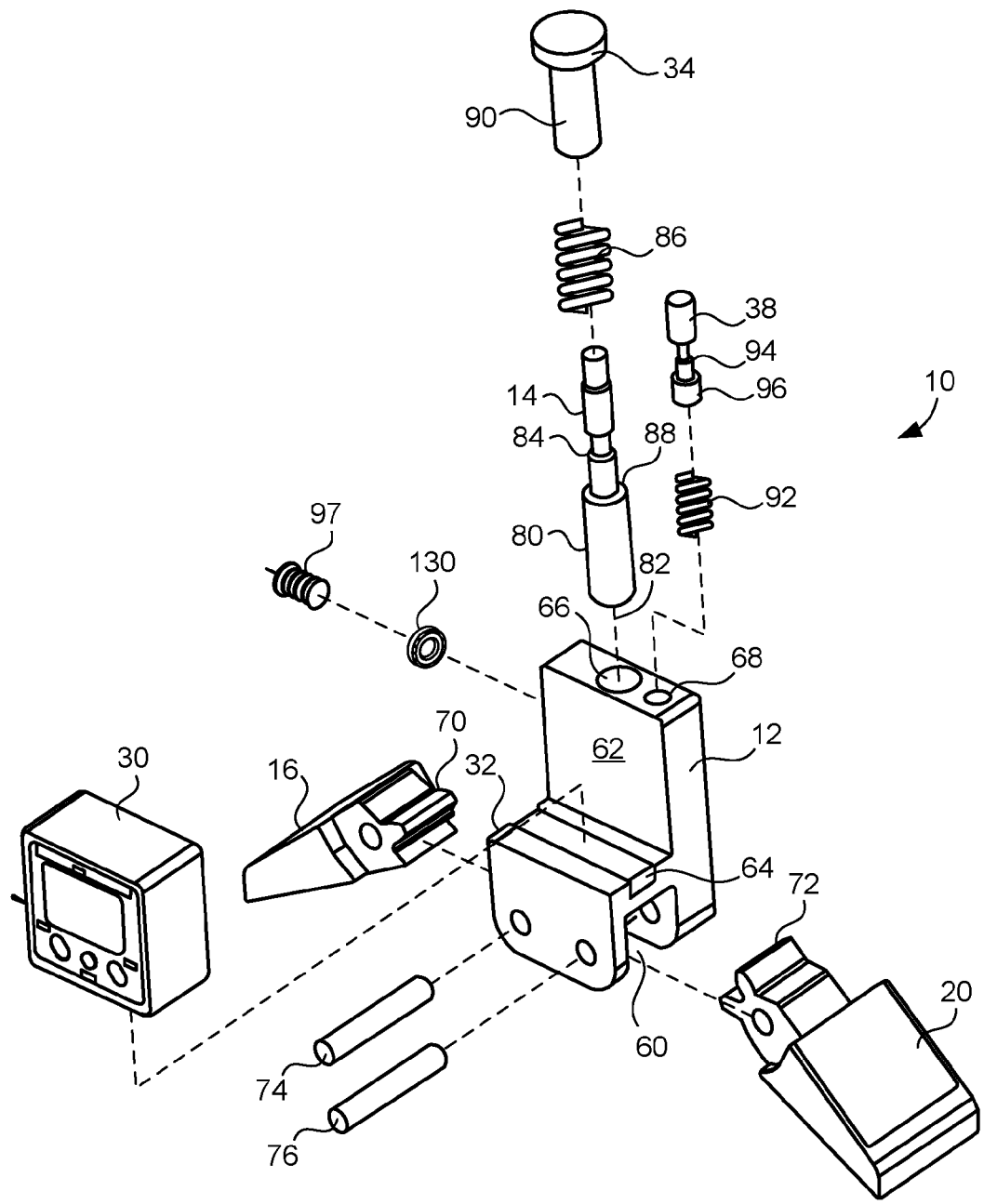
FIG. 3 is an exploded view of the universal center punch of the present invention.

FIG. 3 is an exploded view of the universal center punch 10 of the present invention. In FIG. 3, the universe universal center punch 10 includes the body 12. Body 12 has a channel 60 opening at the bottom thereof. The body 12 furthermore has the outwardly extending surface 32 which extends in transverse relation to a face 62 of the body 12. A magnet 64 is illustrated as received within the slot in the outwardly extending surface 32. Body 12 furthermore includes a passage 66 so as to receive the punch rod 14 therein and a hole 68 which receives the pushbutton 38 therein.

The first leg 16 and the second leg 20 have respective ends 70 and 72 received within the channel 60. Each of the legs 16 and 18 includes a hole therein through which pins 74 and 76 secure the ends 70 and 72 in pivotal relation within the channel 60. Importantly, it can be seen that the end 70 of leg 16 has a tooth extending outwardly therefrom. Similarly, the end 72 of the leg 20 has a pair of teeth extending outwardly therefrom. When installed within the channel 60, the tooth of the first leg 16 will mesh between the teeth of the second leg 20. As such, legs 16 and 20 will be suitably linked together so as to move in correspondence with each other. This assures that each of the legs assumes a common orientation with respect to the outer round surface of a pipe. Also, it is impossible for one leg to extend a different angular orientation than the other leg. Ultimately, if desired, the legs 16 and 20 can extend so that the bottom surfaces 40 and 42 of each of the legs 16 and 20 will extend in a common plane. This application can be carried out when a marking is to be established upon a flat surface. Ultimately, the wedge shape of each of legs 16 and 20 provides a better visual indication to the user of the orientation of each of the legs upon the workpiece.

The inclinometer 30 will have a bottom surface thereof affixed to the outwardly extending surface 32 of body 12. The inclinometer 30 can be magnetically affixed to this outwardly extending surface. Ultimately, since the outwardly extending surface 32 is entirely planar and extends transverse to the face 32 of the body 12, it is assured that the inclinometer 30 is in a proper orientation for measuring the inclination of the universal center punch 10.

In FIG. 3, the punch rod 14 is particularly illustrated. The punch rod 14 includes the punch element 80 at the lower end thereof. Punch element 80 will have a point 82 at the bottom thereof. Point 82 will be that element of the punch rod 16 that is used to mark the underlying workpiece. The punch rod 14 also includes a recess 84 along the length thereof. As will be described hereinafter, the recess 84 will serve to receive a locking element so that the punch rod 14 can be retained in its charged position. A spring 86 will be positioned within the passage 66 so as to bear upon the shoulder 88 of the punch rod 14. When compressed, the spring 86 will charge the punch rod 14 and create the force necessary for the proper marking of the workpiece. The portion 34 will be affixed to the punch rod 14 (or formed therewith). The portion 34 includes a knob at the upper end thereof. A cylindrical portion 90 extends downwardly so as to engage with the punch rod 14 during the installation process.

The pushbutton 38 is illustrated as received within the hole 68. A spring 92 is positioned within the hole 68 so as to urge the pushbutton 38 upwardly. The pushbutton 38 includes a recess 94 which will receive a locking element when the punch rod 14 is released from its charged position. The pushbutton 38 further includes an abutment portion 96 which will bear against the locking element so as to maintain the locking element in engagement within the recess 84 of the punch rod 14. The pushbutton 38 includes a surface that will extend outwardly above the top of the body 12, once installed.

In FIG. 3, there is shown a ball 130 which can be placed within the interior of the body 12 in the manner to be described hereinafter. A setscrew 97 serves to secure the ball 130 within the interior of the body 12.

Figure 4:
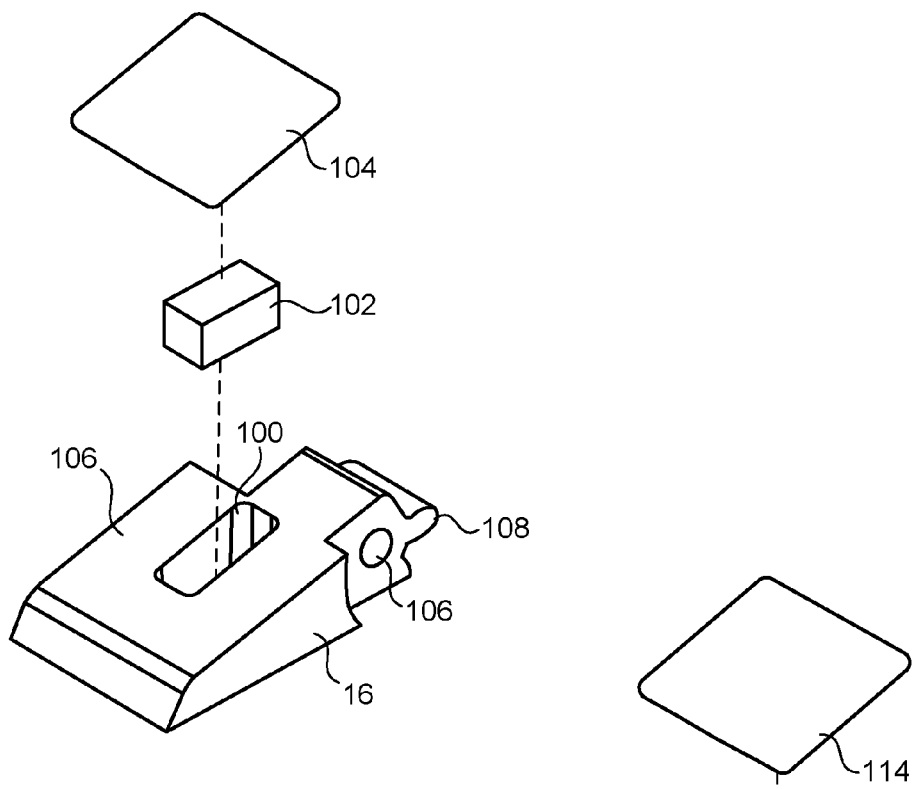
FIG. 4 is a perspective and exploded view showing one of the legs as used in the universal center punch of the present invention.

FIG. 4 is an exploded view of the first leg 16. It can be seen that the first leg 16 includes an orifice 100 formed therein. A magnet 102 is received within the orifice 100. A cover 104 can then be positioned over the magnet 102 and secured against the top surface 106 of the leg 16. The magnet 102 is positioned within the orifice 100 so as to be magnetically attractive to an underlying workpiece. The cover 104 can be in the nature of a label for display purposes. The cover 104 can be used to retain the magnet 102 within orifice 100. Alternatively, the magnet 102 can be adhesively secured, or otherwise bonded, within the orifice 100.

The first leg 16 has a hole 106 extending therethrough. Hole 106 is adapted to receive the pin 74 and to establish the pivotal relationship between the leg 16 and the body 12. A tooth 108 extends outwardly from an end of the first leg 16. As was described herein previously, the tooth 108 will mesh with the pair of teeth of the second leg 20.

Figure 5:
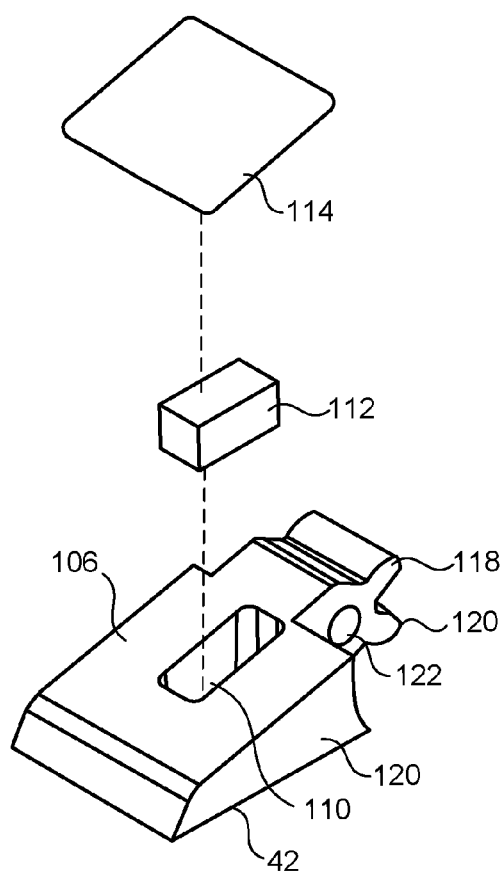
FIG. 5 is an exploded perspective view of the other leg as used in the universal center punch of the present invention.

FIG. 5 shows the second leg 20. Second leg 20 also includes an orifice 110 formed therein. Magnet 112 will be received within orifice 110. The cover 114 can be placed over the magnet 112 and onto the top surface 116 of the second leg 20. As such, the magnet 112 will be properly secured within the orifice 110 so that the bottom surface 42 of the second leg 20 can be magnetically secured to the underlying workpiece. The second leg 20 also includes a pair of teeth 118 and 120 extending outwardly of an end thereof. The tooth 108 of the first leg 16 will be received between the teeth 118 and 120 of the second leg 20. A hole 122 extends through the leg 20. Hole 122 serves to receive the pin 76 therein. This establishes the pivotal relation between the second leg 20 and the body 12.

Figure 6:
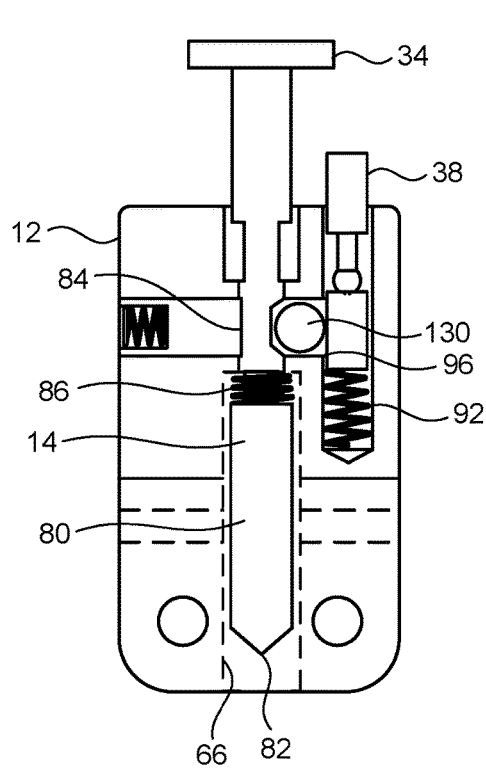
FIG. 6 is a cross-sectional view showing the operation of the universal center punch of the present invention with the punch rod in a charged position.

FIG. 6 shows the operation of the universal center punch 10 of the present invention. In particular, FIG. 6 shows the punch rod 14 in its charged position. In this charged position, the pointed end 82 of the punch rod 14 will be recessed within the passage 66 of the body 12. The spring 86 is illustrated as compressed and bearing against the shoulder 88 of the punch element 80. Spring 86 will serve to exert a strong force upon the punch element 80 so as to cause the punch rod 14 to move downwardly when released from its locked position. The portion 34 of the punch rod 14 extends outwardly of the top of the body 12. In order to establish the compressed relationship between the spring 86 and the punch element 80, an upward force is applied to the portion 34.

The pushbutton 38 is shown in its upper position. In this upper position, the abutment surface 96 will bear against the ball 130 so that the ball 130 is urged against the recess 84 of the punch rod 14. As such, the punch rod 14 will be locked in its charged position. Spring 92 urges the pushbutton 38 to this upper position.

Figure 7:
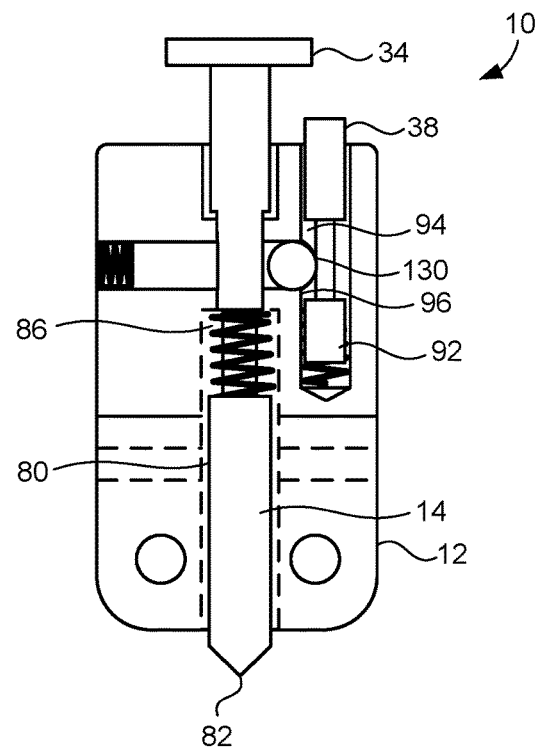
FIG. 7 is cross-sectional view showing the operation of the universal center punch of the present invention in which the punch rod is in the released position.

FIG. 7 shows the punch rod 14 in its released position. As can be seen, the pushbutton 38 has been depressed. This serves to release the ball 130 from its locked position against the punch rod 14. Ultimately, the ball 130 will travel so as to reside within the recess 94 of the pushbutton 38. This causes the spring 86 to exert a force upon the punch element 80 so as to cause the punch element 82 travel downwardly with force. As such, the point 82 of the punch element 80 will extend outwardly beyond the bottom of the body 12. This will establish a proper marking on the underlying workpiece.

Following the actuation of the punch rod 14, the portion 34 can be moved upwardly so that the ball 130 will move back into engagement with the recess 84 of the punch rod 14. Once the ball 130 moves into the recess 84 of the punch rod 14, the pushbutton 38 will move upwardly by the action of the spring 92. As such, the universal center punch 10 is properly recharged for further marking.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A universal center punch comprising:
a body having a passage extending therein;
a punch rod extending along said passage of said body;
a first leg pivotally mounted adjacent one side of said body so as to extend outwardly of said body; and
a second leg pivotally mounted adjacent an opposite side of said body so as to extend outwardly of said body.

2. The universal center punch of claim 1, said first and second legs being linked together such that a movement of one leg of said first and second legs causes a corresponding movement of the other leg of said first and second legs.

3. The universal center punch of claim 2, said first leg having at least one tooth thereon, said second leg having at least one tooth that meshes with the tooth of said first leg.

4. The universal center punch of claim 3, said body having a channel formed at an end thereof, said first and second legs having a portion positioned in said channel, the teeth of said first and second legs meshing together within said channel.

5. The universal center punch of claim 1, said first leg having a first magnet thereon or therein, said second leg having a second magnet thereon or therein.

6. The universal center punch of claim 5, said first leg having an orifice formed therein, said first magnet received in said orifice, said second leg having another orifice formed therein, said second magnet received in said another orifice.

7. The universal center punch of claim 6, said first leg having a covering affixed thereto and located over said first magnet, said second leg having another cover affixed thereto and located over said second magnet.

8. The universal center punch of claim 1, each of said first and second legs having a generally planar bottom surface.

9. The universal center punch of claim 8, each of said first and second legs having a wedge shape with a first end that has a thickness less than a thickness of said second end, said second end pivotally mounted to said body, said first end extending outwardly of said body.

10. The universal center punch of claim 1, further comprising:
an inclinometer affixed to said body, said inclinometer adapted to measure an inclination of said punch rod.

11. The universal center punch of claim 10, said inclinometer being removably affixed to said body.

12. The universal center punch of claim 11, said body having an outwardly extending surface, said inclinometer being removably affixed to said outwardly extending surface, said outwardly extending surface being in a plane transverse to a longitudinal axis of said punch rod.

13. The universal center punch of claim 12, said inclinometer being magnetically connected to the outwardly extending surface.

14. The universal center punch of claim 1, further comprising:
a spring received in said passage of said body, said spring bearing against a surface of said punch rod.

15. The universal center punch of claim 14, said punch rod having a portion extending outwardly of said body at an upper end thereof, said portion of said punch rod movable upwardly so as to compress said spring and to charge said punch rod.

16. The universal center punch of claim 15, further comprising:
a pushbutton resiliently mounted to or within said body and having a surface extending outwardly of said body, said pushbutton cooperative with said punch rod so as to cause the charged punch rod to be released.

17. The universal center punch of claim 16, further comprising:
a ball positioned in an interior of said body and cooperative with said punch rod and said pushbutton, said ball movable to a first position so as to lock said punch rod in the charged position, said ball movable to a second position so as to release said punch rod from the charged position.

18. The universal center punch of claim 17, said pushbutton having a recessed formed thereon, said ball received in said recess when in said second position, said punch rod having a recessed formed therein, said ball received in said recess of said punch rod when in said first position.

19. A universal center punch comprising:
a body having a passage extending therein;
a punch rod extending along said passage of said body;
a first leg pivotally mounted adjacent one side of said body so as to extend outwardly of said body; and
a second leg pivotally mounted adjacent an opposite side of said body so as to extend outwardly of said body, said first and second legs being linked together such that a movement of one leg of said first and second legs causes a corresponding movement of the other leg of said first and second legs.

20. The universal center punch of claim 19, said first leg having a first magnet thereon or therein, said second leg having a second magnet thereon or therein.

\* \* \* \* \*